Patented June 18, 1946

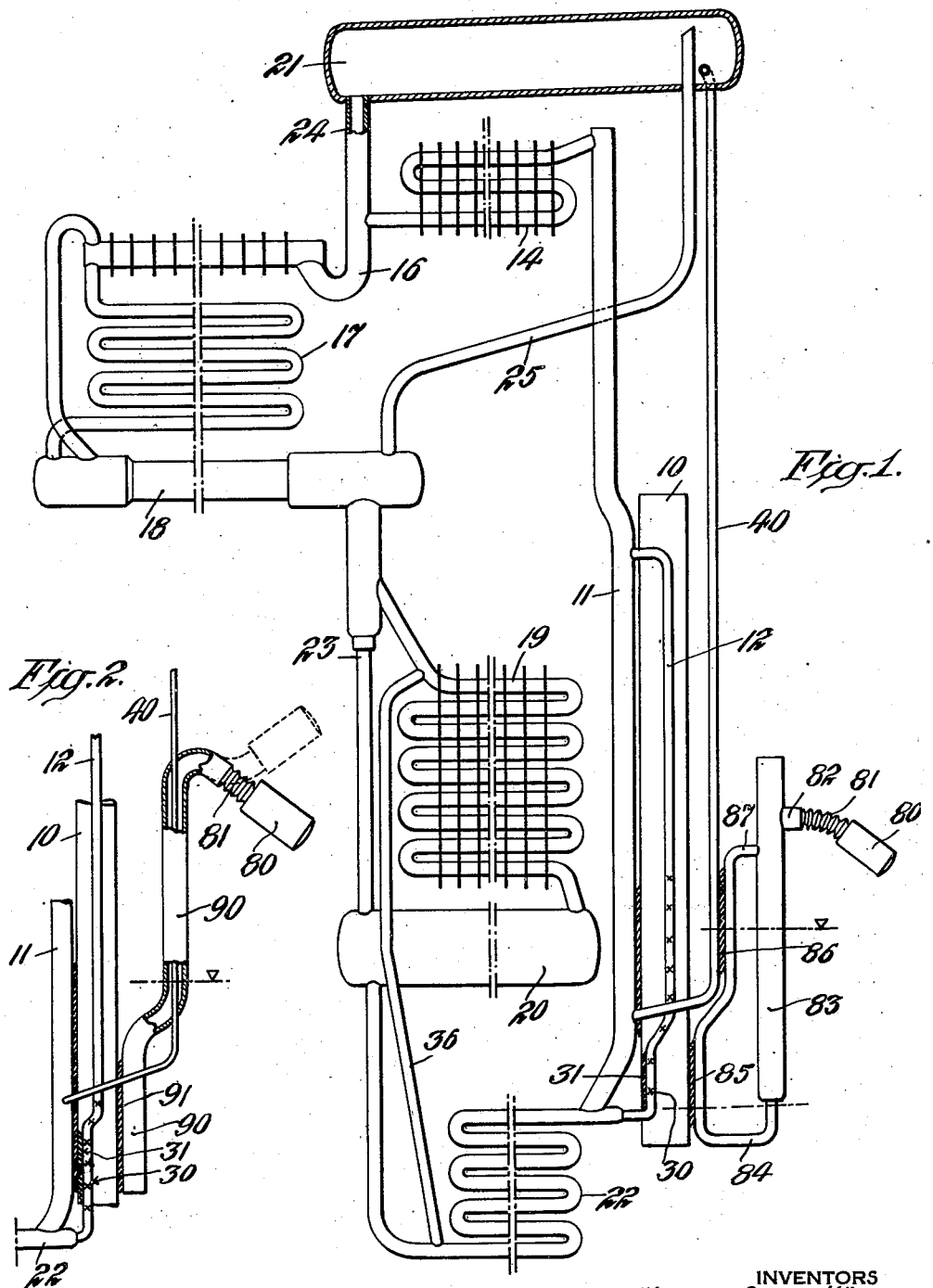

2,402,415

UNITED STATES PATENT OFFICE 2,402,415

ABSORPTION REFRIGERATING APPARATUS

Wilhelm Georg Kögel and Nils Erik Widell, Stockholm, Sweden

Application February 10, 1943, Serial No. 475,334
In Sweden February 12, 1942

10 Claims. (Cl. 62—5)

This invention relates to absorption refrigerating apparatus of the continuous cycle inert gas type including a gas bubble pump adapted during normal operation to effect continuous circulation of absorption solution through the boiler and absorber.

The object of this invention is to provide a method of and means for controlling the operation of an absorption system of the above type.

According to the present invention the apparatus includes an auxiliary liquid circulating pump operable at will and adapted to convey absorption solution intended for purposes other than absorption and in particular for effecting controlling operations during operation of said apparatus.

The invention includes a method of controlling the operation of absorption apparatus of the above type which consists in periodically setting in operation an auxiliary gas bubble pump to raise absorption solution to a higher level and delivering the raised absorption solution into an apparatus element other than the absorber to control the operation of said element.

More specifically the invention includes a method of defrosting an evaporator of an absorption apparatus of the above type which consists in setting an auxiliary gas bubble pump in operation to deliver absorption solution for defrosting purposes.

The invention will be hereinafter more fully described with reference to the accompanying drawing illustrating several embodiments of the invention by way of example and in which:

Fig. 1 shows diagrammatically an absorption refrigerating apparatus having a pump operative according to the invention.

Fig. 2 shows a different means for starting the auxiliary pump.

Referring to Fig. 1, 10 designates the heating tube or flue of an absorption refrigerating apparatus working for example with water, hydrogen and ammonia. A tubular boiler 11 connected in heat-conductive relation with the heating tube 10, as by welding, communicates in known manner with a riser pipe 12, and an air-cooled condenser 14, thence through a U-seal 16 with an evaporator 17. The upper part of the evaporator in the usual manner is formed as a room cooler and is provided with cooling fins. The lower coiled part serves for low temperature cooling such as ice-making.

The gas mixture evolved in the evaporator passes through a gas heat exchanger 18, a conduit 23, to an absorber vessel 20 and thence upwardly through the coil absorber 19 in the usual manner back to the evaporator. Connected to the condenser 14 and the gas heat exchanger 18 is the usual pressure vessel 21 communicating through conduit 24 with the condensate conduit and through conduit 25 with the gas heat exchanger.

The solution degasified in the boiler flows to the absorber coil 19 through a liquid heat exchanger 22 and a conduit 36 and passes from the absorber vessel 20 through the inner tube of the heat exchanger 22 to a pump tube 30. This pump is arranged in heat-conductive connection with the heating tube 10 by spot welding points 31. The manner of operation of apparatus of this kind is well known and will not be described more fully herein.

According to the invention there is provided an auxiliary pump conduit 40 communicating for example with the lower part of the boiler conduit 11. The pump conduit 40 terminates at its upper end in the pressure vessel 21. This pump pumps the hot liquid from the boiler into the pressure vessel 21 and thence into the evaporator 17, which will cause rapid defrosting of the evaporator since the boiler liquid has a temperature varying between +130° and +180°. The auxiliary pump 40 is heated by a heat transfer system, preferably of the evaporating-condensing type.

This system consists of a collector 80 and a flexible tube 81, such as a tombac tube, or any other flexible conduit, which communicates through a pipe socket 82 with a conduit 83 having a diameter large enough to prevent rising gas bubbles pumping the solution upwardly therethrough. From the lower end of the wide tube 83 extends a narrower U-tube 84 which, at 85, is connected in heat-conductive relation with the heating tube 10, preferably by welding. The rising leg of the U-tube 84 is, at 86, connected with the pump 40, and enters at 87 into the wide tube 83.

The collector 80 is filled with a heat-transferring agent of a suitable kind. When this collector is raised, its content will flow through the flexible connection 81 into the wide tube 83 and into the U-tube 84. Here, the liquid owing to the heating zone 85 will boil or possibly be pumped upwardly so that the heat of the heating tube through condensation or the hot pumped solution will be transferred at the contact zone 86 to the pump 40 which will thus be set in operation. Since the heat transfer system, except for the collector 80 and the flexible conduit 81, may be enclosed in the usual boiler insulation, the heat losses will be very small during transfer of heat to the pump 40.

The vapours evolved at the contact point 85 will gradually condense at the coldest part 80 so that the system gradually boils dry due to collection of the transfer agent in the collector 80. During this time the system contains only vapour which insulates the pump 40 so that the heat transfer by conduction from the point 85 through the tube 84 to the point 86 is so small as to prevent further vapour expulsion in the pump.

As a filling for the system an agent is preferably chosen which has a working pressure as low as possible relatively to that of the refrigerating apparatus. The starting of the pump 40 for defrosting action is in this case particularly simple, since it is only necessary to raise the collector 80 and then release the same to effect the defrosting operation, and if the auxiliary system is suitably filled, the operation of the pump 40 and therewith the defrosting process will cease automatically. By suitably forming the collector 80, for example, by increasing its surface by means of fins or other cooling elements, it is possible to hasten the initial condensation therein, thus also shortening the defrosting process. This will enable control to be effected without regulating devices, valves or other sensitive elements as hitherto used. The collector 80 may obviously be raised either manually or thermostatically, if desired through the intermediary of spring devices.

Fig. 2 shows another embodiment including an auxiliary heat transfer system. The pump 40 is led through the interior of the auxiliary system which consists of a wide tube 90 in heat-conductive connection at 91 with the heating tube 10. The collector 80 is connected to the wide tube 90 by means of the flexible conduit 81. When the contents of the collector 80 by momentarily raising the latter are emptied into the wide tube 90, said contents will vapourise adjacent the hot zone 91 and condense in part on conduit 40, thus causing actuation of the pump until all vapour has again condensed in the collector 80. By means of a displaceable sleeve on the collector 80 it is possible to regulate the proportion of vapour condensing in the pump 40 and the collector 80, respectively. It is thus possible to adjust the defrosting period to any existing climatic conditions by displacing the sleeve.

As a heat transfer agent an aqueous solution of an anti-corrosive agent may be used, such as chromic acid alkaline salts. This will result in a relatively short heat-transfer period. If the system, however, contains aniline, for example, this will give long transfer periods. Also benzene, toluene, xylene and other cyclic hydrocarbons as well as many aliphatic hydrocarbons may be used as filling agents.

We claim:

1. A heat transfer system of the evaporating-condensing type, which includes a vapourising element in heat conductive relation with a relatively hot zone, a higher located heat dissipating element in heat conductive relation with a relatively cold zone and a condensing member located above the heat dissipating element.

2. A heat transfer system of the evaporating-condensing type comprising a riser conduit adapted for vapour lift action and having a lower heat absorbing and a higher heat delivering portion, a conduit of larger cross sectional area connected to opposite ends of the riser conduit and a condenser element in communication with said larger conduit.

3. Absorption type refrigerating apparatus having a circuit for absorption liquid, a circulator for causing flow of absorption liquid in said circuit, a heat operated pump for raising absorption liquid upward in said system above said circuit, a source of heat, and an evaporating-condensing system constructed and arranged to transfer heat from said source to said pump.

4. Apparatus as set forth in claim 3 in which the condensing part of said evaporating-condensing system is formed by a flexibly mounted vessel.

5. Apparatus as set forth in claim 3 in which said evaporating-condensing system includes a conduit connected between the evaporating and condensing parts of the system and so constructed and arranged that liquid is caused to flow therethrough by vapor formed in said evaporating part, said conduit being in heat transfer relation with said heat operated pump.

6. Apparatus as set forth in claim 3 in which the condensing part of said evaporating-condensing system is formed by a flexibly mounted vessel, and said evaporating-condensing system is enclosed by thermal insulation, said vessel being located outside of said insulation.

7. An absorption refrigerating system including a generator, a condenser, an evaporator and an absorber, a refrigerant circuit including said generator, said condenser, said evaporator and said absorber, a first solution circuit including said generator and said absorber, a vapor lift pump in said first solution circuit for lifting absorption solution to a point from whence said solution flows by gravity to said absorber, a second solution circuit including said generator and said evaporator, a second vapor lift pump for lifting hot absorption solution from said second solution circuit to a point from whence said hot absorption solution flows by gravity into said evaporator, and a secondary heat transfer system associated with said generator for heating said second vapor lift pump.

8. An absorption refrigerating system including a generator, a condenser, an evaporator and an absorber, a refrigerant circuit including said generator, said condenser, said evaporator and said absorber, a first solution circuit including said generator and said absorber, a vapor lift pump in said first solution circuit for lifting absorption solution to a point from whence said solution flows by gravity to said absorber, a second solution circuit including said generator and said evaporator, a second vapor lift pump for lifting hot absorption solution from said second solution circuit to a point from whence said hot absorption solution flows by gravity into said evaporator, a secondary heat transfer system for heating said second vapor lift pump, and means incorporated in said secondary heat transfer system whereby the operation of said system is manually initiated and automatically stopped after a predetermined time interval.

9. An absorption refrigerating system having a first solution circuit including a generator and an absorber, a vapor lift pump in said first solution circuit for lifting absorption solution into a part of said generator from whence said solution flows by gravity to said absorber, a second solution circuit including said generator and an evaporator, a second vapor lift pump for lifting hot absorption solution in said second solution circuit to a point from whence said hot absorption solution flows by gravity into said evaporator, a secondary heat transfer system charged with a volatile fluid and having a heat receiving part associated with said generator, a heat transfer part associated with said second vapor lift pump, and a condensing part for storing said volatile fluid, the construction and arrangement of said secondary heat transfer system being such that said system is manually initiated and is automatically stopped by collecting said volatile fluid in said condensing part.

10. An absorption refrigerating system including a generator, a condenser, an evaporator and an absorber, a refrigerant circuit including said generator, said condenser, said evaporator and said absorber, a first solution circuit including said generator and said absorber, a vapor lift pump in said first solution circuit for lifting absorption solution into a part of said generator from whence said solution flows by gravity to said absorber, a second solution circuit including said generator and said evaporator, a second vapor lift pump in said second solution circuit for lifting hot absorption solution from said second solution circuit to a point from whence said hot absorption solution flows by gravity into said evaporator, a secondary heat transfer system charged with a volatile fluid and having a heat receiving part, a heat transfer part associated with said second vapor lift pump, and a fluid collecting chamber, said fluid collecting chamber being arranged to collect substantially all of the volatile fluid contained in said secondary heat transfer system to thereby render said system ineffective as a heat transfer system.

WILHELM GEORG KÖGEL.
NILS ERIK WIDELL.